Patented Feb. 6, 1934

1,946,218

UNITED STATES PATENT OFFICE

1,946,218

PROCESS FOR PRODUCING MATERIAL FOR THE TREATMENT OF HIDES AND SKINS

Emil Lenk and Felix Lippner, Vienna, Austria, assignors, by mesne assignments, to American Cyanamid & Chemical Corporation, New York, N. Y., a corporation of Delaware No Drawing. Application October 1, 1930, Serial No. 485,818, and in Austria June 30, 1928

16 Claims. (Cl. 149—2)

This invention relates to an improved method of manufacturing a product for unhairing, cleaning and bating hides and skins.

Heretofore it has been common practice to employ animal excrements such as dog manure and pigeon manure for bating hides and skins, but owing to the technical development of the art artificial bates have come into general use, these bates falling into two classes, i. e., bacteria and pancreatic. The most important of the bacteria group is "Erodin", a product containing a pure culture of bacillus erodiens together with a nutrient medium. Bacillus erodiens however does not show proteolytic properties.

In recent years many attempts have been made to produce a satisfactory bating agent but the products produced result in uncontrollable fermentation or autolysis, while in some cases the bacteria attack the collagen of the hides, all of which is objectionable and unsatisfactory.

We have found that excellent bating agents, which at the same time may be employed for unhairing and cleaning hides and skins, can be obtained by cultivating proteolytic bacteria on protein-containing nutrient media, such as, for example, chopped meat or vegetable matter. Examples of protein-containing vegetable nutrient media are leguminous flours such as the flour of peas, beans, the soy bean and grain flours, such as oats flour, for example.

In the practice of our invention we have found it advantageous to acidify the nutrient medium, i. e., the meat or vegetable material, with hydrochloric acid, sulfuric acid, lactic acid or a similar acid before inoculating the nutrient medium with a pure culture or mixture of cultures of proteolytic bacteria. The degree of acidification depends upon the hydrogen ion concentration most favorable for the kind or kinds of bacteria employed. If the growth of the bacteria takes place under the formation of acid, the optimal hydrogen ion concentration is maintained by continuous neutralization of the acids formed with alkalis.

It has been found advantageous to employ as a nutrient medium a material which contains in itself proteid digestants or proteases, or to add such materials to the protein-containing nutrient media. Chopped animal organs such as the pancreatic glands is an example of such a nutrient medium, or other medium which has an acid reaction through mild autolysis. An example of a vegetable nutrient medium containing proteases is yeast.

Although the proteases originally contained in the nutrient medium are quickly destroyed or changed through the action of the proteolytic bacteria, nevertheless the nutrient medium seems to cooperate with the bacteria cultures in a specific manner.

After acidification, if acidification has been resorted to, the nutrient medium is inoculated with proteolytic bacteria, preferably staphylococcus pyogenes albus and bacterium coli commune either singly or in admixture. The mixture is left at a temperature optimal for growth, but in any event not higher than 50° C. for a sufficient length of time for autolytic action to take place and a rich bacteria flora to develop.

The mixture containing the bacteria culture, the products formed from the material during the procedure, and the bacteria enzymes, is then dried in the presence of an inert material.

The resultant product is extremely resistant to temperature changes, and the hydrogen ion concentration thereof in solution may vary within wide limits, i. e., between pH 5 and pH 10, and consequently it has all the qualifications necessary to secure a uniform bating action, even under slightly acid, neutral or alkaline reaction conditions, so that the hides may be pretreated with acid without slowing up the bating process.

It is customary to add to the bate materials neutral salts as deliming agents, i. e., ammonium- or alkali salts which form a soluble lime salt. It has been found in practice, however, that such additions, in most cases, will not bring about complete deliming of the skins. The skins, therefore, had to be treated for deliming by a special process employing acids of various kinds. The addition of acids or acid salts to the bates used heretofore was impracticable inasmuch as the enzymes contained in these prior bates were rendered ineffective to a great extent by the action of acids.

These difficulties have been overcome by the present invention, however, in that the bacteria proteases which are effective in the product of our invention are extremely resistant to acids. This qualification makes it possible to add acids as well as neutral salts to the dry product. Examples of suitable acids and salts are citric acid, tartaric acid, or acid salts, sodium bisulfate ($NaHSO_4$), acid fluorides ($NaFHF$), or sodium monophosphate ($NaH_2PO_4$) or sodium bisulfite ($NaHSO_3$). It will be appreciated, therefore, that this fact makes it possible to delime and bate at the same time whereby a considerable saving in time and costs is effected as compared with existing processes.

A further advantage so far as our product is concerned resides in the fact that our product is suitable also for unhairing and cleaning hides and skins which have not been limed, and that when applying them for bating limed skins it does not matter whether the liming was by the use of lime or of other alkalies or alkaline liquids.

The following are typical examples of our new process:—

*Example one.*—100 kilograms of finely ground meat are acidified with 100 to 500 cc. of 36% hydrochloric acid. The mixture is then inoculated with bacteria forming proteolytic ferments, i. e., staphylococcus pyogenes albus and bacterium coli commune, suitable catalysts added and left standing for at least a day in thin layers at a temperature of approximately 37° C. until a rich bacteria flora has developed. The substance is then mixed with equal amounts by volume of wood flour, dried at a temperature not exceeding 50° C., ground, mixed with a salt having either a neutral or acid reaction, such as, for example, ammonium sulfate or sodium bisulfate, and converted to the customary ferment strength.

*Example two.*—100 kilograms of oats flour together with 200 liters of water are inoculated while stirring, at a temperature of approximately 37° C. with the bacteria above mentioned. The acid formed during the process is continuously neutralized by the addition of a dilute solution of soda, so that the hydrogen ion concentration does not exceed the value of pH 4.0. After 48 to 72 hours the whole material is absorbed by adding wood flour, and drying in vacuum at a temperature not exceeding 40° C. and mixed with suitable neutral or acid salts.

*Example three.*—Beef liver, after having adopted a slightly acid reaction, is finely ground, and, after inoculation with proteolytic bacteria, such as, for example, staphylococcus pyogenes albus and bacterium coli commune, is left in the incubator until, in addition to the autolytic actions a rich bacteria flora has developed on the meat. The paste is then mixed with saw dust and dried at a low temperature. The finely ground dry product is then diluted to any desired enzymatic strength through the addition of wood flour or bran, and ammonium sulfate or similar salts.

What we claim is:—

1. The process of producing material for the treatment of hides and skins which comprises treating approximately 100 kilograms of finely ground meat, with 100 to 500 cc. of 36% hydrochloric acid, inoculating the mixture with staphylococcus pyogenes albus and bacterium coli commune, adding suitable catalysts, allowing the same to stand at a temperature of approximately 37° C. for a sufficient length of time for a rich bacteria flora to develop, mixing the material with wood flour, drying the mixture at a temperature not greater than 50° C. and mixing the resulting mass with an organic salt.

2. The process of producing material for the treatment of hides and skins which comprises mixing approximately 100 kilograms of oats flour with approximately 200 liters of water, inoculating this mixture with a proteolytic bacteria while stirring the mixture and with the mixture at a temperature of approximately 37° C., neutralizing by the continuous addition of dilute solution of soda so that the hydrogen ion concentration does not exceed the value of pH 4.0, adding wood flour after a lapse of 48 to 72 hours, then drying the material in vacuum at a temperature not greater than 40° C. and finally adding to the mixture suitable neutral or acid salts.

3. A method of treating hides and skins which comprises cultivating a substantially pure culture of the class of bacteria consisting of bacillus coli commune and staphylococcus pyogenes albus, and immersing said hides and skins in a solution containing said culture.

4. A method of treating hides and skins which comprises cultivating a substantially pure culture of the class of bacteria consisting of bacillus coli commune and staphylococcus pyogenes albus, grown in an acid medium containing proteins, and immersing said hides and skins in a solution containing said culture.

5. A method of treating hides and skins which comprises cultivating a substantially pure culture of the class of bacteria consisting of bacillus coli commune and staphylococcus pyogenes albus, grown in a strongly acid medium containing proteins, and immersing said hides and skins in a solution containing said culture.

6. A method of treating hides and skins which comprises cultivating a substantially pure culture of the class of bacteria consisting of bacillus coli commune and staphylococcus pyogenes albus, adding a salt thereto, and immersing said hides and skins in a solution containing said culture.

7. A method of treating hides and skins which comprises cultivating a substantially pure culture of the class of bacteria consisting of bacillus coli commune and staphylococcus pyogenes albus, drying the same, and immersing said hides and skins in a solution containing said culture.

8. A method of treating hides and skins which comprises cultivating a substantially pure culture of the class of bacteria consisting of bacillus coli commune and staphylococcus pyogenes albus, mixing the same with a substantial quantity of an inert material, and immersing said hides and skins in a solution containing said culture.

9. A method of treating hides and skins which comprises cultivating a substantially pure culture of the class of bacteria consisting of bacillus coli commune and staphylococcus pyogenes albus, adding an acid salt thereto, and immersing said hides and skins in a solution containing said culture.

10. A method of treating hides and skins which comprises cultivating a substantially pure culture of bacillus coli commune and staphylococcus pyogenes albus, and immersing said hides and skins in a solution containing said culture.

11. A method of treating hides and skins which comprises cultivating a substantially pure culture of bacillus coli commune and staphylococcus pyogenes albus, grown in an acid medium containing proteins, and immersing said hides and skins in a solution containing said culture.

12. A method of treating hides and skins which comprises cultivating a substantially pure culture of bacillus coli commune and staphylococcus pyogenes albus, grown in a strongly acid medium containing proteins, and immersing said hides and skins in a solution containing said culture.

13. A composition for the treatment of hides and skins comprising a substantially pure culture of the class of bacteria consisting of bacillus coli commune and staphylococcus pyogenes albus.

14. A composition for the treatment of hides and skins comprising a substantially pure culture of the class of bacteria consisting of bacillus coli commune and staphylococcus pyogenes albus, mixed with an inert material.

15. A composition for the treatment of hides and skins comprising a substantially pure culture of the class of bacteria consisting of bacillus coli commune and staphylococcus pyogenes albus mixed with a salt.

16. A composition for the treatment of hides and skins comprising a substantially pure culture of the class of bacteria consisting of bacillus coli commune and staphylococcus pyogenes albus mixed with an acid salt.

EMIL LENK.
FELIX LIPPNER.